United States Patent
Pai (10) Patent No.: US 8,477,015 B1
(45) Date of Patent: Jul. 2, 2013

(54) SYSTEM AND METHOD FOR USING AN INPUT DATA SIGNAL AS A CLOCK SIGNAL IN A RFID TAG STATE MACHINE

(75) Inventor: Srinath B. Pai, Bangalore (IN)

(73) Assignee: National Semiconductor Corporation, Santa Clara, CA (US)

( * ) Notice: Subject to any disclaimer, the term of this patent is extended or adjusted under 35 U.S.C. 154(b) by 2773 days.

(21) Appl. No.: 11/122,418

(22) Filed: May 5, 2005

(51) Int. Cl.
*H04Q 5/22* (2006.01)
*G08B 13/14* (2006.01)

(52) U.S. Cl.
USPC ...... 340/10.1; 340/10.2; 340/10.5; 340/572.1

(58) Field of Classification Search
USPC ............ 340/10.1–10.5, 572.1; 329/303, 329/310; 327/270, 271; 702/107, 85, 86
See application file for complete search history.

(56) References Cited

U.S. PATENT DOCUMENTS

| | | | |
|---|---|---|---|
| 5,815,819 A * | 9/1998 | Ohta et al. | 455/574 |
| 5,875,218 A * | 2/1999 | Barham et al. | 375/376 |
| 5,898,684 A * | 4/1999 | Currivan et al. | 370/350 |
| 6,192,056 B1 * | 2/2001 | Tsuruoka | 370/504 |
| 6,784,813 B2 * | 8/2004 | Shanks et al. | 341/53 |
| 7,194,055 B2 * | 3/2007 | Tandai et al. | 375/368 |
| 7,388,468 B2 * | 6/2008 | Diorio et al. | 340/10.4 |
| 2005/0052279 A1 * | 3/2005 | Bridgelall | 340/10.1 |

* cited by examiner

*Primary Examiner* — Nam V Nguyen
(74) *Attorney, Agent, or Firm* — Andrew S. Viger; Wade J. Brady III; Frederick J. Telecky, Jr.

(57) ABSTRACT

A system and method is disclosed for using an input data signal as a clock signal in a state machine of a radio frequency identification (RFID) tag. An output of a demodulator in the RFID tag is directly coupled to a clock input of the command state machine in the RFID state machine. The command state machine receives an edge detect signal directly from the input data signal and then immediately generates backscatter signals to begin a backscatter process. The edge detect signal may comprise a rising edge of a data symbol of the RFID protocol. The immediate initiation of the backscatter process reduces latency of the backscatter process in the RFID state machine.

20 Claims, 6 Drawing Sheets

SYSTEM AND METHOD FOR USING AN INPUT DATA SIGNAL AS A CLOCK SIGNAL IN A RFID TAG STATE MACHINE

TECHNICAL FIELD OF THE INVENTION

The present invention relates generally to radio frequency identification (RFID) systems and, more particularly, to a system and method for using an input data signal as a clock signal in a RFID tag state machine.

BACKGROUND OF THE INVENTION

Radio frequency identification (RFID) technology is widely used to provide a non-contact automatic identification system. RFID technology provides an automatic method for efficiently collecting product, place, time or transaction data without human intervention.

A RFID system generally comprises a reader unit that uses an antenna to transmit radio energy to interrogate a responder such as a radio frequency identification (RFID) tag. As is well known, a RFID tag does not have an on-chip battery, but rather receives its energy from the incoming RF signal from the reader unit. The RFID tag uses the energy from the incoming RF signal to extract the data that is stored in the chip of the RFID tag and send the data back to the reader unit. The reader unit can then send the data from the RFID tag to a computer for further processing.

The RFID system usually comprises a reader unit and a plurality of RFID tags. The RFID system can be used to identify persons or objects that have a RFID tag and that are located within the reading range of reader unit. Using a predefined communication protocol the reader unit is capable of communicating with all of the RFID tags that are located within range.

In one embodiment of a RFID system the reader unit transmits data to a RFID tag with an amplitude modulated (AM) radio frequency (RF) signal having a frequency in the range from nine hundred MegaHertz (900 MHz) to two and fourth tenths GigaHertz (2.4 GHz). In the RFID tag a demodulator recovers the baseband digital data signal from the incoming RF signal. A demodulator in a RFID tag should be able to recover the baseband digital data signal of a RF amplitude that has sufficient power to power the chip of the RFID tag.

The demodulator in each RFID tag recovers the baseband digital data signal and provides it to a state machine in the RFID tag. If the RFID tag is to provide the reader unit with a response to the input signal (such as a responsive zero signal or a responsive one signal), then the state machine provides backscatter control signals for a backscatter signal to be sent to the reader unit at a particular frequency. The term "backscatter" refers to a method by which a RFID tag communicates with a reader unit.

The baseband digital data signal has a data period that comprises a low going pulse to indicate the presence of a data symbol that has been sent out by the reader unit. The data period of the baseband digital data signal also comprises a high going pulse to indicate to the reader unit when the reader unit is to listen and identify the type of backscatter signal, if any, from the RFID tags in its field.

Figure 1:
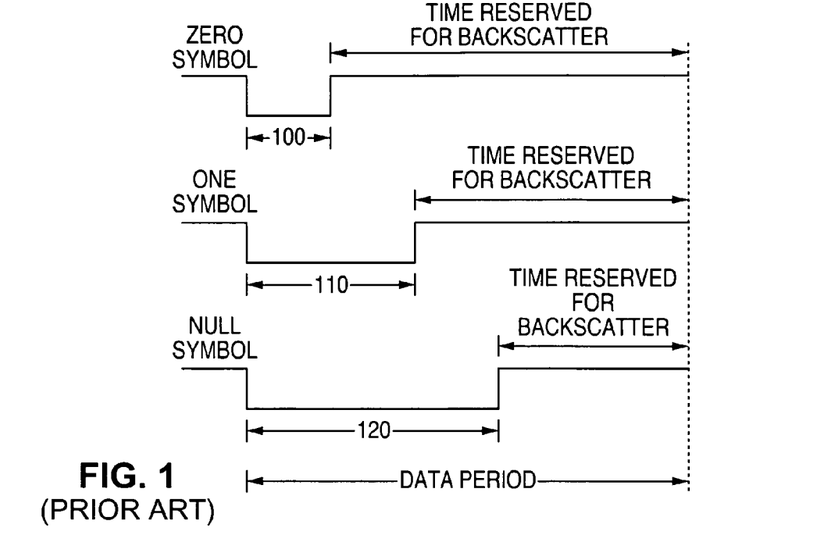
FIG. 1 is a timing diagram illustrating prior art symbol waveforms for a Zero symbol and a One symbol and a Null symbol in a radio frequency identification (RFID) protocol.

The period of the low going pulse is coded by pulse width modulation (PWM) for three data symbols that are used in the RFID protocol. The three data symbols are Zero, One, and Null. A timing diagram shown in FIG. 1 illustrates a data period for each of the three RFID data symbols.

The first data period that is illustrated is the data period for the Zero symbol. The low going pulse indicates the beginning of the data symbol. The length of time 100 that occurs between the low going pulse and the high going pulse indicates that the data symbol is a Zero symbol. The remainder of the data period after the high going pulse of the Zero symbol represents the time reserved for the reader unit to detect a backscatter signal, if a backscatter signal is present.

A typical length of time 100 for a Zero symbol is approximately three microseconds (3.0 µs). A typical data period is approximately twelve and one half microseconds (12.5 µs). This means that the time for the reader unit to search for a backscatter signal after a Zero symbol has occurred is approximately nine and one half microseconds (9.5 µs).

The second data period that is illustrated is the data period for the One symbol. The low going pulse indicates the beginning of the data symbol. The length of time 110 that occurs between the low going pulse and the high going pulse indicates that the data symbol is a One symbol. The remainder of the data period after the high going pulse of the One symbol represents time reserved for the reader unit to detect a backscatter signal, if a backscatter signal is present.

A typical length of time 110 for a One symbol is approximately six microseconds (6.0 µs). A typical data period is approximately twelve and one half microseconds (12.5 µs). This means that the time for the reader unit to search for a backscatter signal after a One symbol has occurred is approximately six and one half microseconds (6.5 µs).

The third data period that is illustrated is the data period for the Null symbol. The low going pulse indicates the beginning of the data symbol. The length of time 120 that occurs between the low going pulse and the high going pulse indicates that the data symbol is a Null symbol. The remainder of the data period after the high going pulse of the Null symbol represents time reserved for the reader unit to detect a backscatter signal, if a backscatter signal is present. However, no backscatter response is expected by the reader unit in response to an input Null symbol.

A typical length of time 120 for a Null symbol is approximately nine microseconds (9.0 µs). A typical data period is approximately twelve and one half microseconds (12.5 µs). This means that the time for the reader unit to search for a backscatter signal after a Null symbol has occurred is approximately three and one half microseconds (3.5 µs). As previously mentioned, no backscatter response is expected by the reader unit in response to an input Null symbol.

The state machine in the RFID tag first has to recover and identify a data symbol in the first portion of a data period of the baseband digital data signal. The state machine then performs state transitions to obtain backscatter control signals. The backscatter control signals determine whether a backscatter signal will be sent back to the reader unit during the remaining portion of the data period. If a backscatter signal is to be transmitted, the backscatter control signals also determine a frequency to be used to transmit the backscatter signal.

In order for all of the RFID tags to uniformly and correctly recover the data symbols there are two requirements. The first requirement is that all of the RFID tags must have a reference clock of the same frequency in order to accurately and uniformly measure the pulse and data periods. The second requirement is that all of the RFID tags mutually agree on the pulse widths for the Zero symbol, the One symbol and the Null symbol. T0 this end the reader unit periodically sends out calibration pulses. The reader unit periodically sends out both oscillator calibration pulses and data calibration pulses.

During the oscillator calibration process the reader unit sends to the RFID tags a series of fixed duration oscillator calibration pulses. The state machine in each RFID tag uses the oscillator calibration pulses to tune the on-chip oscillator in its respective RFID tag to a fixed frequency.

During the data calibration process the reader unit sends to the RFID tags a series of data calibration pulses to train the RFID tags to recognize the pulse widths of the data symbols. That is, the data calibration pulses teach the RFID tags to recognize the various pulse widths of the Zero symbol, the One symbol and the Null symbol.

Figure 2:
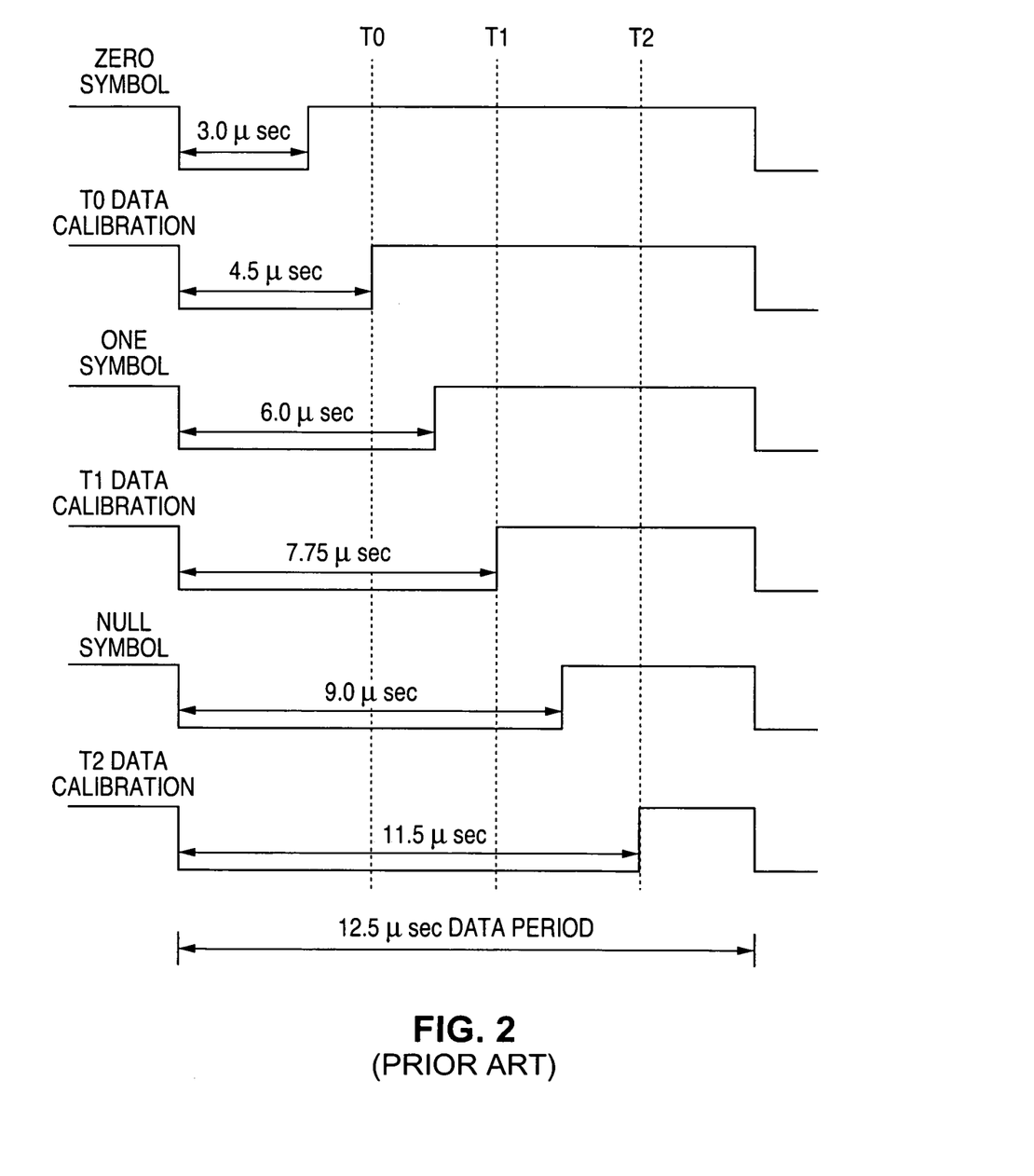
FIG. 2 is a timing diagram illustrating exemplary prior art data calibration pulses T0, T1 and T2 and their temporal locations with respect to the symbol waveforms shown in FIG. 1.

FIG. 2 illustrates a timing diagram showing the data calibration pulses with respect to waveforms of the Zero symbol, the One symbol and the Null symbol. The first data calibration pulse is designated with the symbol "T0". The T0 pulse indicates the location of the upper bound for the Zero symbol and the location of the lower bound for the One symbol. A typical T0 pulse occurs four and one half microseconds (4.5 µs) after the initial low going pulse of the data symbols.

The second data calibration pulse is designated with the symbol "T1". The T1 pulse indicates the location of the upper bound for the One symbol and the lower bound for the Null symbol. A typical T1 pulse occurs seven and seventy five hundredths microseconds (7.75 µs) after the initial low going pulse of the data symbol.

The third data calibration pulse is designated with the symbol "T2". The T2 pulse indicates the location of the boundary for the end of the backscatter period (approximately one microsecond (1.0 µs) before the end of the data period). A typical T2 pulse occurs eleven and one half microseconds (11.5 µs) after the initial low going pulse of the data symbol.

From FIG. 2 it may be seen that the duration of the Zero symbol is less than the duration of the first data calibration pulse T0. That is, the up going pulse at the end of the Zero symbol occurs before the up going pulse at the end of the first data calibration pulse T0.

Similarly, from FIG. 2 it may be seen that the duration of the One symbol is greater than the duration of the first data calibration pulse T0 but less than the duration of the second data calibration pulse T1. The up going pulse at the end of the One symbol occurs after the up going pulse at the end of the first data calibration pulse T0 but before the up going pulse at the end of the second data calibration pulse T1.

Lastly, from FIG. 2 it may be seen that the duration of the Null symbol is greater than the duration of second data calibration pulse T1 but less than the duration of the third data calibration pulse T2. The up going pulse at the end of the Null symbol occurs after the up going pulse of the second data calibration pulse T1 but before the up going pulse of the third data calibration pulse T2.

Figure 3:
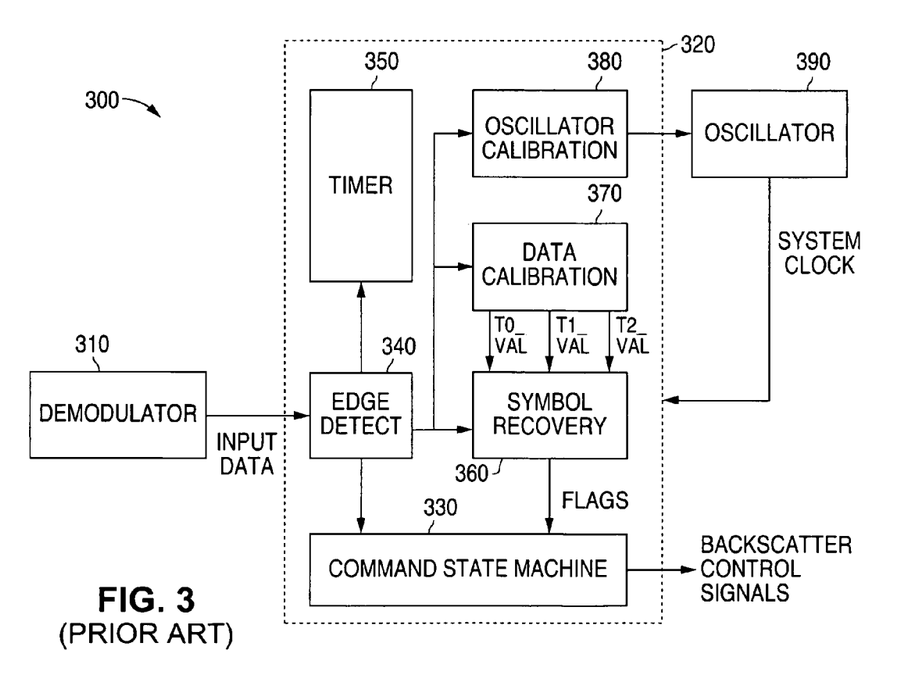
FIG. 3 is a block diagram illustrating an exemplary demodulator and state machine in a prior art RFID tag.

FIG. 3 illustrates a block diagram 300 of an exemplary prior art demodulator 310 and prior art state machine 320 in an exemplary RFID tag. Demodulator 310 demodulates the input RF signal and provides input data to state machine 320. State machine 320 comprises command state machine 330, edge detect unit 340, timer unit 350, symbol recovery unit 360, data calibration unit 370, and oscillator calibration unit 380.

Demodulator 310 provides the input data to edge detect unit 340 of state machine 320. Edge detect unit 340 detects the edge transitions of the input data (both low going pulses and high going pulses) and provides the edge detect information to other units in state machine 320. Specifically, edge detect unit 340 provides the edge detect information to command state machine 330, timer unit 350, symbol recovery unit 360, data calibration unit 370 and oscillator calibration unit 380. Timing information from the timer unit 350 is also provided on signal lines (not shown) to symbol recovery unit 360, data calibration unit 370 and oscillator calibration unit 380.

Oscillator calibration unit 380 uses oscillator calibration pulses from timer unit 350 to obtain tuning control signals for tuning oscillator 390. Oscillator 390 generates the system clock signal. Command state machine 330 generates backscatter control signals. The backscatter control signals comprise a backscatter enable signal (denoted "bks_en") and a backscatter data signal (denoted "bks_data").

The timer unit 350 operates using the system clock signal from oscillator 390. The timer unit 350 counts through every calibration/data period that is sent by the reader unit (not shown). The data calibration unit 370 stores the duration of the data calibration pulses T0, T1 and T2 using the timer unit 350 and the edge detect unit 340. The data calibration unit 370 provides these stored values of data calibration pulses T0, T1, and T2 to the symbol recovery unit 360 as T0_VAL, T1_VAL and T2_VAL.

The symbol recovery unit 360 generates flag pulses that indicate the likely data symbol (Zero symbol, One symbol, or Null symbol) that is present during each data period that has been activated by a low going pulse. Symbol recovery unit 360 generates a zero flag signal, a one flag signal, and a null flag signal and provides the flag signals to the command state machine 330.

Figure 4:
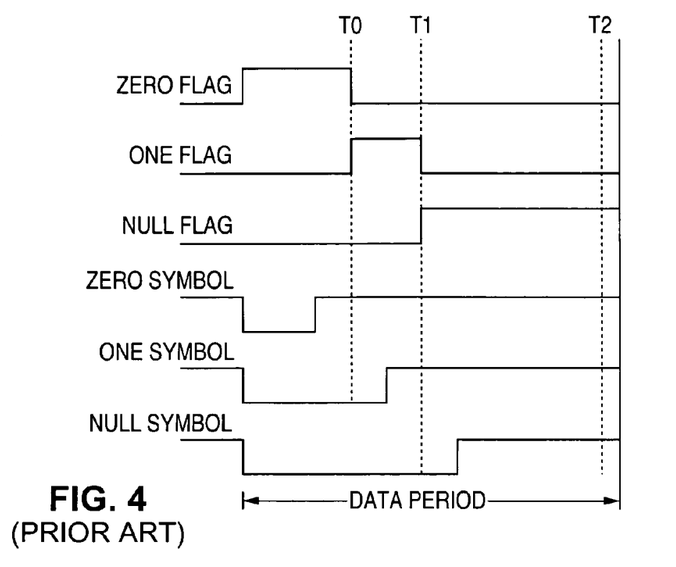
FIG. 4 is a timing diagram illustrating exemplary prior art symbol flags and their temporal locations with respect to the symbol waveforms and data calibration pulses T0, T1 and T2 shown in FIG. 1.

FIG. 4 illustrates a timing diagram showing the three flag signals with respect to the data calibration pulses and waveforms of the Zero symbol, the One symbol and the Null symbol. When the low going pulse begins a data period, the Zero flag is set to a logical value of one. This means that the likely data symbol within the data period is first identified as a Zero symbol. If the high going pulse of a Zero symbol is detected before the occurrence of the T0 pulse, this means that the data symbol is a Zero symbol. The Zero flag is reset to a logical value of zero at the time of the T0 pulse.

The Zero flag pulse is "on" for approximately four and one half microseconds (4.5 µs). This is because the Zero flag pulse extends from zero microseconds (0.0 µs) at the initial low going pulse of the data symbol until the assertion of the T0 pulse at four and one half microseconds (4.5 µs).

If the timer unit 350 counts beyond the time represented by the T0 pulse and no high going pulse has been detected, this means that the likely data symbol is not a Zero symbol. Then the Zero flag is reset to a logical value of zero and the One flag is set to a logical value of one. This means that the likely data symbol within the data period is now identified as a One symbol. If the high going pulse of a One symbol is detected before the occurrence of the T1 pulse, this means that the data symbol is a One symbol. The One flag is reset to a logical value of zero at the time of the T1 pulse.

The One flag pulse is "on" for approximately three and twenty five hundredths microseconds (3.25 µs). This is because the One flag pulse extends from four and one half microseconds (4.5 µs) at the assertion of the T0 pulse until the assertion of the T1 pulse at seven and seventy five hundredths microseconds (7.75 µs).

If the timer unit 350 counts beyond the time represented by the T1 pulse and no high going pulse has been detected, this means that the likely data symbol is not a One symbol. Then the One flag is reset to a logical value of zero and the Null flag is set to a logical value of one. This means that the data symbol within the data period is now identified as a Null symbol. The Null flag continues with a logical value of one until the end of the data period.

The Null flag pulse is "on" for approximately four and seventh five hundredths microseconds (4.75 µs). This is because the Null flag pulse extends from seven and seventy five hundredths microseconds (7.75 μs) at the assertion of the T1 pulse until the end of the data period at twelve and one half microseconds (12.50 μs).

The rising edge of the Zero symbol waveform is spaced sufficiently far away from the T0 pulse. The rising edge of the One symbol waveform is spaced sufficiently far away from the T0 pulse and the T1 pulse. The rising edge of the Null symbol waveform is spaced sufficiently far away from the T1 pulse and the T2 pulse. Therefore, the rising edges of the Zero symbol waveform, the One symbol waveform, and the Null symbol waveform are also spaced sufficiently far away from the flag signals that are generated by the symbol recovery unit 360.

In the exemplary prior art state machine 320 the command state machine 330 operates using the system clock that is generated by oscillator 390. The command state machine 330 receives the output of the edge detect unit 340 and uses the output of the edge detect unit 340 to receive notification of a rising edge of an incoming input data signal. There is a delay involved in the edge detection process within the edge detect unit 340. This delay is on the order of two or three clock cycles. For a typical system clock that is operating at a frequency of two and two tenths megahertz (2.2 MHz) the delay is approximately from one microsecond (1.0 μs) to one and one half microseconds (1.5 μs).

The delay in the edge detect unit 340 means the command state machine 330 must wait for a period of time equal to the delay before the command state machine 330 receives the output of the edge detect unit 340. This, in turn, causes the outputs of the command state machine 330 to be delayed by a corresponding amount. It would be advantageous to eliminate this delay within state machine 320.

Therefore, there is a need in the art for a system and method that is capable of eliminating a delay in an edge detect signal that is provided to a command state machine within a state machine of a RFID tag. In particular, there is a need in the art for a system and method that is capable of rapidly providing an edge detect signal to a command state machine within a state machine of a RFID tag.

SUMMARY OF THE INVENTION

T0 address the above-discussed deficiencies of the prior art it is a primary object of the present invention to provide a system and method for efficiently providing an edge detect signal to a command state machine within a state machine of a RFID tag.

An advantageous embodiment of the present invention comprises an apparatus and method for using an input data signal as a clock signal in a state machine of a RFID tag. The apparatus comprises a demodulator that demodulates a radio frequency signal to obtain a data input signal and an output of the demodulator that is directly connected to a clock input of a command state machine of the RFID state machine.

The command state machine in the RFID state machine receives an edge detect signal directly from the input data signal and then immediately generates backscatter signals to begin a backscatter process. The edge detect signal may comprise a rising edge of one of the data symbols of the RFID protocol. The immediate initiation of the backscatter process by the command state machine reduces latency of the backscatter process in the RFID state machine. The reduction in latency contributes to higher throughput of the RFID system as a whole.

It is an object of the present invention to provide a system and method for efficiently providing an edge detect signal to a command state machine within a state machine of a RFID tag.

It is another object of the invention to provide a system and method for using an input data signal as a clock signal in a command state machine within a state machine of a RFID tag.

It is yet another object of the present invention to provide a system and method for reducing latency in a state machine of a RFID tag.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future, uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 5 through 8, discussed below, and the various embodiments used to describe the principles of the present invention in this patent document are by way of illustration only and should not be construed in any way to limit the scope of the invention. Those skilled in the art will understand that the principles of the present invention may be implemented in any type of suitably arranged radio frequency identification (RFID) device.

Figure 5:
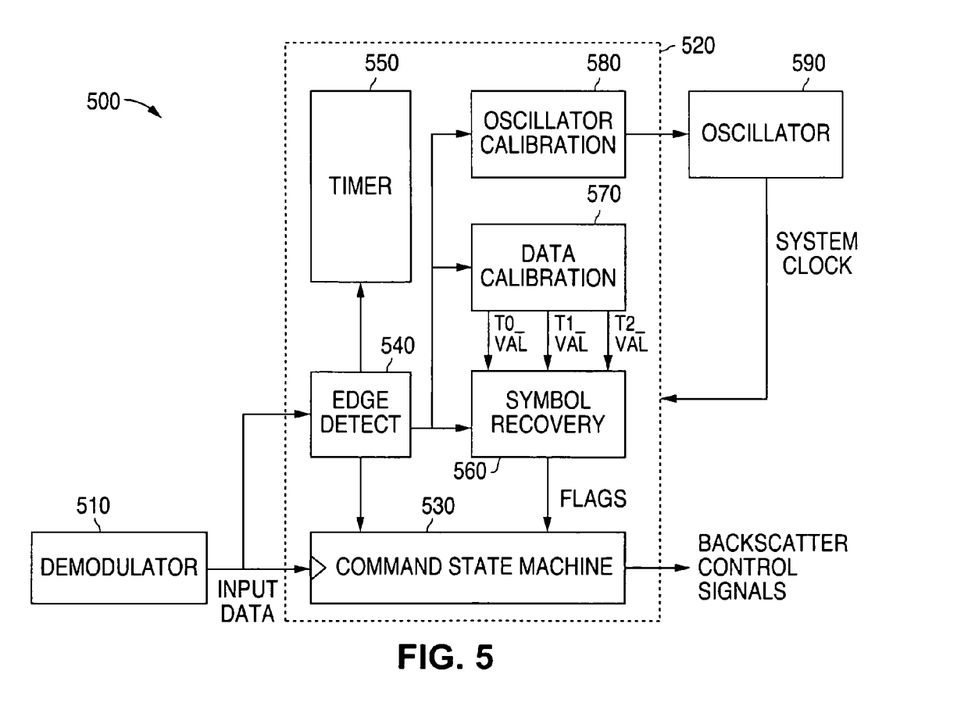
FIG. 5 is a block diagram illustrating an exemplary demodulator and state machine in a RFID tag in accordance with the principles of the present invention.

FIG. 5 illustrates a block diagram 500 of an exemplary demodulator 510 and state machine 520 of the present invention within an exemplary RFID tag of the present invention. Demodulator 510 demodulates the input RF signal and provides input data to state machine 520. State machine 520 comprises command state machine 530, edge detect unit 540, timer unit 550, symbol recovery unit 560, data calibration unit 570, and oscillator calibration unit 580.

Demodulator 510 provides the input data directly to command state machine 530. In addition, demodulator 510 provides the input data to edge detect unit 540 of state machine 520. Edge detect unit 540 detects the edge transitions of the input data (both low going pulses and high going pulses) and provides the edge detect information to other units in state machine 520 except the command state machine 530. Therefore, the delay generated within edge detect unit 540 is not passed on to the command state machine 530. Specifically, edge detect unit 540 provides the edge detect information to timer unit 550, symbol recovery unit 560, data calibration unit 570 and oscillator calibration unit 580. Timing information from timer unit 550 is also provided on signal lines (not shown) to symbol recovery unit 560, data calibration unit 570 and oscillator calibration unit 580.

Oscillator calibration unit 580 uses oscillator calibration pulses from timer unit 550 to obtain tuning control signals for tuning oscillator 590. Oscillator 590 generates the system clock signal. Command state machine 530 generates backscatter control signals. The backscatter control signals comprise a backscatter enable signal (denoted "bks_en") and a backscatter data signal (denoted "bks_data").

The timer unit 550 operates using the system clock signal from oscillator 590. The timer unit 550 counts through every calibration/data period that is sent by the reader unit (not shown). The data calibration unit 570 stores the duration of the data calibration pulses T0, T1, and T2 using the timer unit 550 and the edge detect unit 540. The data calibration unit 570 provides these stored values of the data calibration pulses T0, T1, and T2 to the symbol recovery unit 560 as T0_VAL, T1_VAL and T2_VAL.

The symbol recovery unit 560 generates flag pulses that indicate the likely data symbol (Zero symbol, One symbol, or Null symbol) that is present during each data period that has been activated by a low going pulse. Symbol recovery unit 560 generates a Zero Flag signal, a One Flag signal, and a Null Flag signal and provides the flag signals to the command state machine 530.

A command state machine comprises flip flop circuits called state registers (not shown). In the prior art command state machine 330 all of the state registers are clocked by the system clock from oscillator 390, and state transitions occur after the edge detect unit 340 detects a rising edge on the input data signal. In the command state machine 530 of the present invention all of the state registers of command state machine 530 are clocked by the rising edge of the incoming data from demodulator 510. That is, the clock input to each of the state registers in command state machine 530 is directly connected to the input data signal.

As previously mentioned, the rising edge of the Zero symbol waveform is spaced sufficiently far away from the T0 pulse. The rising edge of the One symbol waveform is spaced sufficiently far away from the T0 pulse and the T1 pulse. The rising edge of the Null symbol waveform is spaced sufficiently far away from the T1 pulse and the T2 pulse. Therefore, the rising edges of the Zero symbol waveform, the One symbol waveform, and the Null symbol waveform are also spaced sufficiently far away from the flag signals that are generated by the symbol recovery unit 560.

Although the incoming input data signal and the system clock are asynchronous with respect to each other, and although the flag signals are being generated by the system clock, the flag signals and the data rise edges of the input data signal are always sufficiently spaced apart. In particular, the flag signals easily meet the set up and hold requirements with respect to the data rise edges of the incoming input data signal. Therefore, it is possible to use the incoming input data signal itself as the clock signal for the command state machine 530 without any detrimental effect.

When the command state machine 530 receives the incoming input data signal directly the command state machine 530 can start the state transitions immediately. This means that the backscatter process can proceed immediately with absolutely no delay. The command state machine 530 immediately generates the backscatter enable signal ("bks_en") upon detecting a rising data edge in the incoming input data signal. This feature reduces the latency in the output path of the state machine 520 and enhances the overall throughput of the RFID tag.

Figure 6:
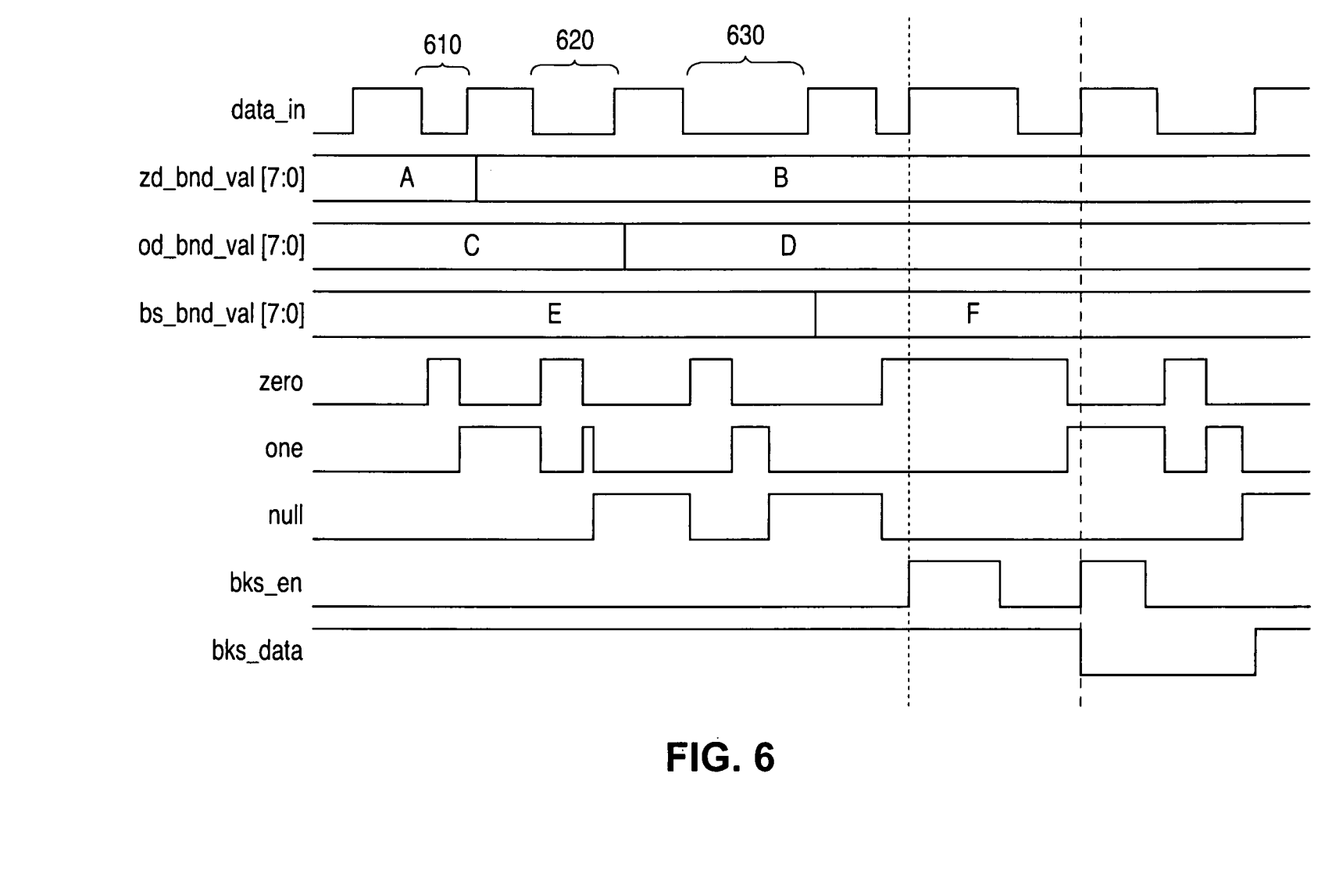
FIG. 6 is a timing diagram illustrating exemplary signal waveforms of the present invention showing the assertion of a backscatter enable signal associated with a rising edge of a data symbol in accordance with the principles of the present invention.

A simulation of a circuit employing the system and method of the present invention was performed to investigate the operation of the state machine 520 of the present invention. FIG. 6 is a timing diagram illustrating exemplary signal waveforms of the present invention obtained from the simulation run. FIG. 6 shows the assertion of a backscatter enable signal associate with a rising edge of a data symbol in accordance with the principles of the present invention.

The incoming input data signal in FIG. 6 is designated "data_in". The "data_in" signal comprises a Zero symbol 610, a One symbol 620, and a Null symbol 630. The signal designated "zd_bnd_val" represents the Zero boundary value. At the end of the T0 pulse (low going pulse) the signal "zd_bnd_val" changes from a state labeled "A" to a state labeled "B" in FIG. 6.

Similarly, the signal designated "od_bnd_val" represents the One boundary value. At the end of the T1 pulse (low going pulse) the signal "od_bnd_val" changes from a state labeled "C" to a state labeled "D" in FIG. 6. The signal designated "bs_bnd_val" represents the end of Backscatter value. At the end of the T2 pulse (low going pulse) the signal "bs_bnd_val" changes from a state labeled "E" to a state labeled "F" in FIG. 6.

The signal designated "zero" represents a Zero flag. The signal designated "one" represents a One flag. The signal designated "null" represents a Null flag. At the time of a rising edge of data following the T1 pulse, only one of the three flags (zero, one, null) is active and the relevant signal type is already established.

The backscatter enable signal is designated "bks_en" and the backscatter data signal is designated "bks_data". These signals represent the output of command state machine 530. As shown by the vertical dotted lines in FIG. 6 these signals are asserted with absolutely no delay with respect to the rising edge of data in the "data_in" signal.

Figure 7:
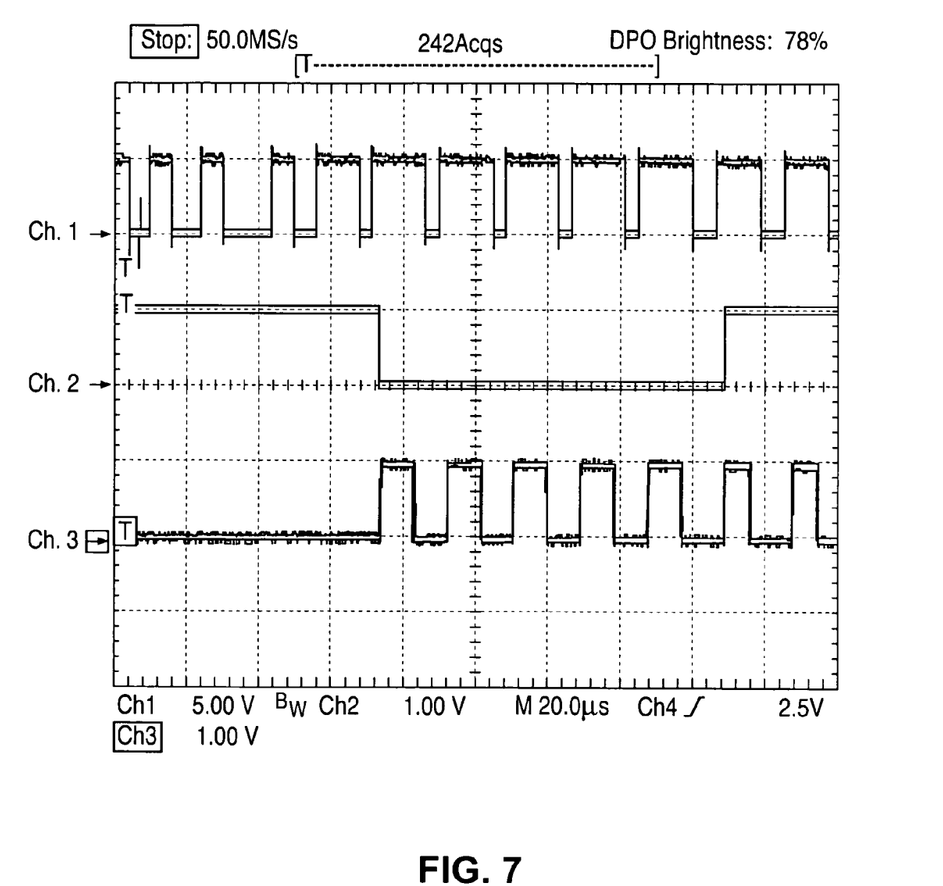
FIG. 7 is an oscilloscope image showing some output signals of an application specific integrated circuit comprising a demodulator and state machine of a RFID tag in accordance with the principles of the present invention.

FIG. 7 is an oscilloscope image showing output signals of an application specific integrated circuit (ASIC) comprising a demodulator 510 and state machine 520 of a RFID tag in accordance with the principles of the present invention. The "data_in" signal of the ASIC is shown in Channel 1 of the oscilloscope image. The backscatter data signal "bks_data" of the ASIC is shown in Channel 2 of the oscilloscope image. The backscatter enable signal "bks_en" of the ASIC is shown in Channel 3 of the oscilloscope image. One observes that the backscatter data signal and the backscatter enable signal that are output from the state machine 520 change immediately following the rising edge of data in the "data_in" signal.

Figure 8:
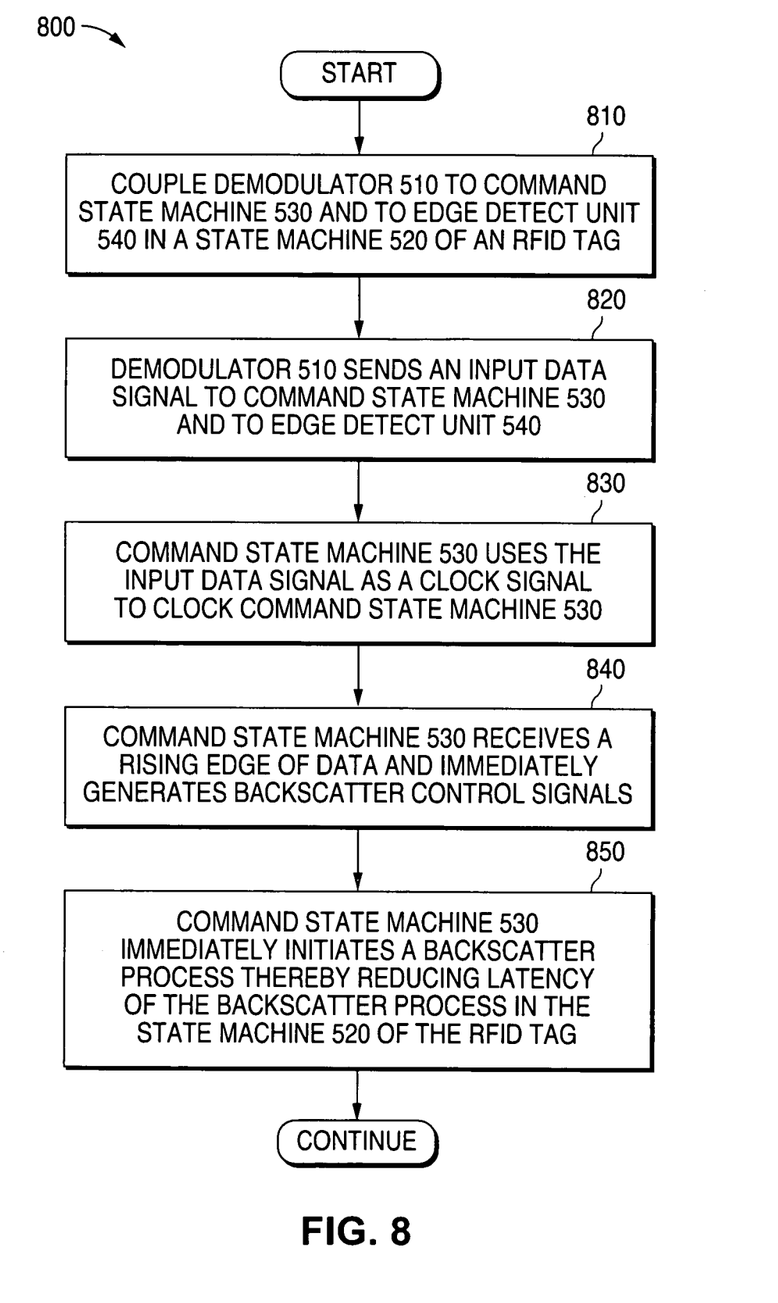
FIG. 8 is a flow chart illustrating an advantageous embodiment of a method of the present invention.

FIG. 8 is a flow chart 800 illustrating an advantageous embodiment of a method of the present invention. In the first step demodulator 510 is coupled to command state machine 530 and to edge detect unit 540 in a state machine 520 of a RFID tag (step 810). Then demodulator 510 sends an input data signal to command state machine 530 and to edge detect unit 540 (step 820). The command state machine 530 uses the input data signal as a clock signal to clock command state machine 530 (step 830).

Then command state machine 530 receives a rising edge of data and immediately generates backscatter control signals (step 840). Command state machine 530 immediately initiates a backscatter process and thereby reduces the latency of the backscatter process in the state machine 520 of the RFID tag (step 850).

For purposes of clarity steps 830 through 850 above are set forth sequentially. It is understood, however, that steps 830 through 850 occur substantially concurrently.

Although the present invention has been described with several embodiments, various changes and modifications may be suggested to one skilled in the art. It is intended that the present invention encompass such changes and modifications as fall within the scope of the appended claims.

What is claimed is:

1. An apparatus for providing an edge detect signal to a command state machine of a state machine of a radio frequency identification (RFID) tag, wherein said apparatus comprises:
   a demodulator configured to demodulate a radio frequency signal to obtain a data signal, the demodulator having an output directly connected to a clock input of said command state machine in order to clock said command state machine using said data signal.

2. The apparatus as set forth in claim 1 wherein said command state machine is configured to receive an edge detect signal from said data input signal and to use said edge detect signal to clock said command state machine.

3. The apparatus as set forth in claim 2 wherein said command state machine is configured to generate at least one backscatter signal when said command state machine receives said edge detect signal.

4. The apparatus as set forth in claim 3 wherein said at least one backscatter signal comprises one of: a backscatter enable signal and a backscatter data signal.

5. The apparatus as set forth in claim 2 wherein said edge detect signal comprises a rising edge of an end of a data symbol within said data input signal.

6. The apparatus as set forth in claim 5 wherein said data symbol comprises one of: a Zero symbol, a One symbol, and a Null symbol of a radio frequency identification (RFID) protocol.

7. The apparatus as set forth in claim 2:
   wherein said edge detect signal comprises a rising edge of an end of a data symbol within said data signal; and
   wherein said command state machine is configured to generate at least one backscatter signal when said command state machine receives said rising edge of said end of said data symbol.

8. The apparatus as set forth in claim 7 wherein said at least one backscatter signal comprises one of: a backscatter enable signal and a backscatter data signal.

9. The apparatus as set forth in claim 7 wherein said data symbol comprises one of: a Zero symbol, a One symbol, and a Null symbol of a radio frequency identification (RFID) protocol.

10. A method comprising the steps of:
    demodulating a radio frequency signal using a demodulator in a radio frequency identification (RFID) tag to obtain a data signal; and
    providing said data signal from said demodulator to a clock input of a command state machine in said RFID tag in order to clock said command state machine using said data signal.

11. The method as set forth in claim 10 further comprising the steps of:
    receiving in said command state machine an edge detect signal from said data input signal; and
    clocking said command state machine with said edge detect signal.

12. The method as set forth in claim 11 further comprising the step of:
    generating in said command state machine at least one backscatter signal when said command state machine receives said edge detect signal.

13. The method as set forth in claim 12 wherein said at least one backscatter signal comprises one of: a backscatter enable signal and a backscatter data signal.

14. The method as set forth in claim 11 wherein said edge detect signal comprises a rising edge of an end of a data symbol within said data input signal.

15. The method as set forth in claim 14 wherein said data symbol comprises one of: a Zero symbol, a One symbol, and a Null symbol of a radio frequency identification (RFID) protocol.

16. The method of claim 10, wherein the demodulating and providing steps decrease latency in a state machine of the RFID tag, the state machine comprising the command state machine.

17. A radio frequency identification (RFID) tag, comprising:
    a command state machine; and a demodulator configured to demodulate a radio frequency signal to obtain a data signal, the demodulator having an output directly connected to a clock input of the command state machine in order to clock the command state machine using the data signal.

18. The RFID tag of claim 17, wherein the command state machine is clocked by an edge detect signal in the data signal.

19. The RFID tag of claim 18, wherein the edge detect signal comprises a rising edge of an end of a data symbol within the data signal; and wherein the command state machine is configured to generate at least one backscatter signal when the command state machine receives the edge detect signal.

20. The RFID tag of claim 18, wherein the edge detect signal comprises a rising edge of an end of a data symbol within the data signal; and the data symbol comprises one of: a Zero symbol, a One symbol, and a Null symbol of an RFID protocol.

* * * * *